July 20, 1926.
W. F. DELZER
1,593,247
MECHANICALLY REFRIGERATED SODA FOUNTAIN AND ICE CREAM CABINET
Filed Oct. 30, 1925
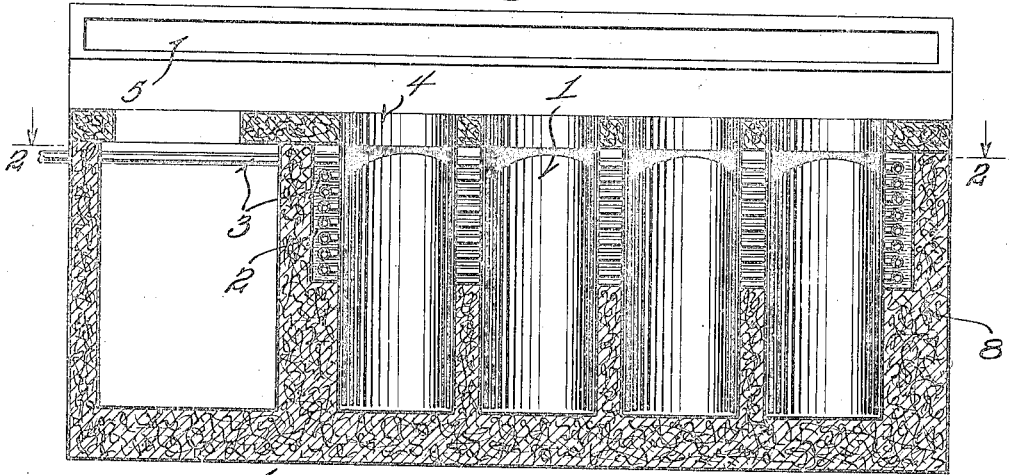
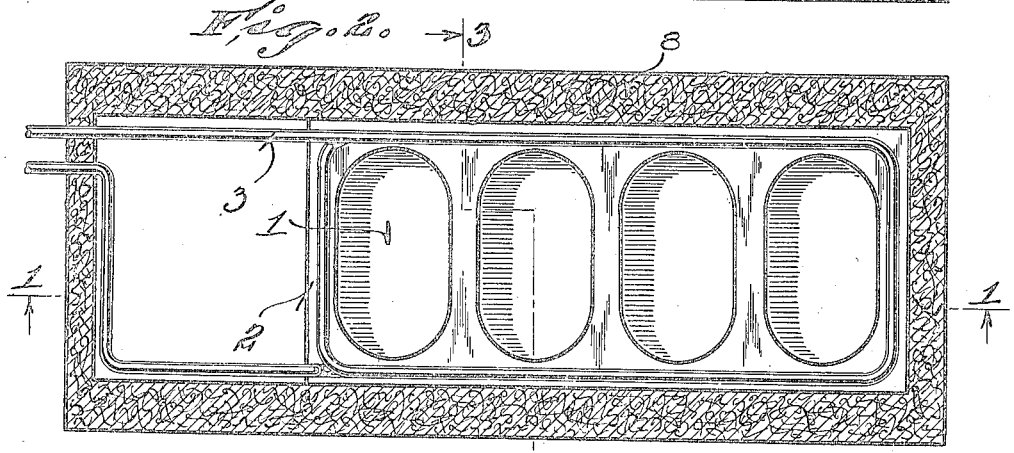
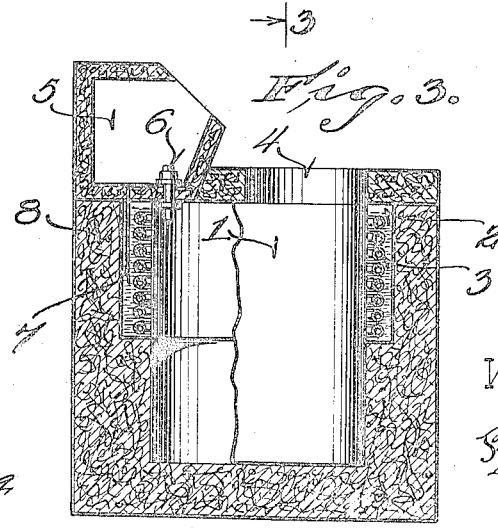
Inventor
William F. Delzer
Witness
Erwin B. Ewing Patented July 20, 1926.

1,593,247

UNITED STATES PATENT OFFICE.

WILLIAM F. DELZER, OF MILWAUKEE, WISCONSIN.

MECHANICALLY-REFRIGERATED SODA FOUNTAIN AND ICE-CREAM CABINET.

Application filed October 30, 1925. Serial No. 65,831.

This invention relates to mechanically refrigerated soda fountain and ice cream cabinets.

In refrigerated ice cream cabinets and soda fountains as heretofore constructed, it has been usual to provide refrigerating coils for the full length of the ice cream container compartment.

The upper portions of these compartments are repeatedly opened and consequently the upper portion of the ice cream is subjected to higher temperatures than the lower portion. It thus became necessary to maintain the entire refrigerating portion of the apparatus at a very low temperature in order to secure proper chilling of the upper portion of the compartment. Consequently the lower portion of the compartment was cooled below the required point rendering the ice cream extremely hard and difficult of handling, which was stored at this portion of the apparatus.

This invention is designed to overcome the above noted defects, and objects of such invention are to provide a refrigerated ice cream and soda fountain cabinet in which the refrigeration is applied at the upper portion of the cabinet at the points most needed and excessive refrigeration of the lower portion does not result.

Further objects are to provide a novel form of refrigerated ice cream and soda fountain cabinet in which the length of piping and equipment required is materially reduced over that heretofore supplied, and in which a very effective and simple means is provided for chilling the compartment for receiving the syrup containers.

Further objects are to provide a refrigerated soda fountain and ice cream cabinet in which an even temperature is maintained throughout, in which the amount of brine required is materially reduced, and in which the running time is also reduced due to the novel construction.

An embodiment of the invention is shown in the accompanying drawings, in which—

Figure 1 is a vertical sectional view through the refrigerated cabinet, such view being a section on the line 1—1 of Figure 2.

Figure 2 is a sectional view on the line 2—2 of Figure 1.

Figure 3 is a sectional view on the line 3—3 of Figure 2.

Referring to the drawings, it will be seen that an ice cream and soda fountain cabinet has been disclosed in which a plurality of compartments 1 are provided for the ice cream containers. These compartments have formed around their upper portion a brine compartment 2 within which the refrigerating pipes 3 are positioned. This brine compartment terminates approximately half way down the ice cream container compartment 1, as shown most clearly in Figures 1 and 3.

It is to be noted that the upper portion of the compartments 1 are provided with openings 4 through their forward half portions and that their rear upper portion or tops are closed. Adjacent the rear portion of the apparatus a syrup container compartment 5 is provided. Within this compartment at a suitable point, the brine filling pipe 6 may be positioned, as shown in Figure 3. The means for chilling this compartment consists of a web or fin 7 which is joined to the metal lining of the inner bottom portion of the compartment 5, as shown in Figure 3. This fin extends into the brine compartment 2 and heat is transmitted through the metal bottom of the syrup container compartment 5 into the fin and from there it is absorbed by the brine.

It is to be noted that the inner and outer walls of all of the compartments are formed of sheet metal and that a filling 8, preferably of cork, is interposed between the inner and outer walls through the entire device.

It is to be noted further that a larger amount of insulation may surround the lower portion of the ice cream container compartments 1 than has heretofore been possible without increasing the size of the cabinet. This also aids in preventing loss due to conduction.

A very simple arrangement of piping 3 may be followed in this construction. For example, as shown in Figure 2, the pipe may extend in a rectangular formation throughout the brine compartment 2 and may surround the several compartments 1 for the ice cream. This is an easily formed construction and in view of the fact that the coils extend only half way down the compartments 1, it is clear that a material saving in pipe results.

It will be seen that due to this construction, the portion of the compartments 1 most affected by outside temperature and exposed to the air with greatest frequency is the portion at which refrigeration takes place.

Further, it is to be noted that the chilled air within the compartments 1 descends and maintains the lower portion of these compartments in a refrigerated condition. Thus an even temperature throughout the entire compartment is attained in the practice of this invention.

Although the invention has been described in considerable detail, it is to be understood that the invention may be variously embodied and is, therefore, to be limited only as claimed.

I claim:

A refrigerated soda fountain and ice cream cabinet comprising a main body portion having outer walls and having a plurality of compartments for the reception of ice cream containers, packing interposed between the outer wall and said compartments, a brine tank associated with the upper portions of said compartments and terminating intermediate the ends of said compartments, refrigerating means within said brine tank, a syrup container receiving compartment positioned above said first mentioned compartment and to one side thereof, said compartment having a fin connected to its inner lower portion and extending into said brine tank, said fin being constructed of heat conducting material.

In testimony that I claim the foregoing I have hereunto set my hand at Milwaukee, in the county of Milwaukee and State of Wisconsin.

WILLIAM F. DELZER.